(12) United States Patent　　(10) Patent No.: US 9,128,209 B2
Dowle　　(45) Date of Patent: Sep. 8, 2015

(54) METHOD AND DEVICE FOR SEPARATING SEISMIC SIGNALS FROM SEISMIC SOURCES

(71) Applicant: CGGVERITAS SERVICES SA, Massy Cedex (FR)

(72) Inventor: Robert Dowle, Massy (FR)

(73) Assignee: CGGVERITAS SERVICES SA, Massy Cedex (FR)

( * ) Notice: Subject to any disclaimer, the term of this patent is extended or adjusted under 35 U.S.C. 154(b) by 437 days.

(21) Appl. No.: 13/716,737

(22) Filed: Dec. 17, 2012

(65) Prior Publication Data

US 2013/0155810 A1　　Jun. 20, 2013

Related U.S. Application Data

(60) Provisional application No. 61/576,014, filed on Dec. 15, 2011.

(51) Int. Cl.
*G01V 1/38* (2006.01)

(52) U.S. Cl.
CPC ................................. *G01V 1/3861* (2013.01)

(58) Field of Classification Search
CPC ..... G01V 1/3808; G01V 1/38; G01V 1/3861; G01V 1/3817
USPC ................. 367/15, 21, 23; 181/111
See application file for complete search history.

(56) References Cited

U.S. PATENT DOCUMENTS

| 3,687,218 | A  | * | 8/1972 | Ritter .............................. 367/23 |
| 6,882,938 | B2 |   | 4/2005 | Vaage et al. |
| 8,842,493 | B2 | * | 9/2014 | Almaas et al. .................. 367/23 |
| 2008/0065333 | A1 |   | 3/2008 | Beasley et al. |
| 2010/0008184 | A1 |   | 1/2010 | Hegna et al. |
| 2010/0299070 | A1 |   | 11/2010 | Abma |
| 2011/0110188 | A1 | * | 5/2011 | Robertsson et al. ............ 367/21 |
| 2012/0092956 | A1 |   | 4/2012 | Soubaras |
| 2012/0218858 | A1 |   | 8/2012 | Soubaras |

FOREIGN PATENT DOCUMENTS

EP　2 259 091 A2　12/2010
WO　　9618117 A1　6/1996
(Continued)

OTHER PUBLICATIONS

Ian Moore et al., "Simultaneous Source Separation Using Dithered Sources"; Society of Exploration Geophysicists; 2008 SEG Annual Meeting, Nov. 9-14, 2008, Las Vegas, Nevada, pp. 2806-2810.
International Search Report in related International Application No. PCT/EP2012/075611, mailed Aug. 16, 2013.
(Continued)

*Primary Examiner* — Ian J Lobo
(74) *Attorney, Agent, or Firm* — Patent Portfolio Builders PLLC

(57) ABSTRACT

System and method for actuating first and second marine acoustic sources in a firing sequence, the firing sequence including at least a first actuation of the first source followed by a first actuation of the second source followed by a second actuation of the first source and a second actuation of the second source. The method includes towing the first source at a depth in water substantially equal to a depth of the second source; establishing a series of reference time instants; actuating the first source with a variable first time delay relative to the series of reference time instants; and actuating the second source with a variable second time delay relative to the series of reference time instants such that time intervals between consecutive activations of the first and second sources are also variable.

20 Claims, 11 Drawing Sheets

(56) References Cited

FOREIGN PATENT DOCUMENTS

| WO | 2009131619 A2 | 10/2009 |
| WO | 2011057324 A1 | 5/2011 |

OTHER PUBLICATIONS

Written Opinion in related International Application No. PCT/EP2012/075611, mailed Aug. 16, 2013.

\* cited by examiner

METHOD AND DEVICE FOR SEPARATING SEISMIC SIGNALS FROM SEISMIC SOURCES

BACKGROUND

1. Technical Field

Embodiments of the subject matter disclosed herein generally relate to methods and systems for generating, acquiring and processing marine seismic data and, more particularly, to mechanisms and techniques for separating seismic signals recorded by streamers and generated by plural marine seismic sources.

2. Discussion of the Background

Marine seismic data acquisition and processing may be used to generate a profile (image) of the geophysical structure under the seafloor (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine whether the oil and gas reservoirs are located.

The traditional marine seismic acquisition uses a seismic source, such as an air gun or air gun array, to generate acoustic energy. The seismic source is towed by a vessel under water, and the generated acoustic energy propagates toward the subsurface where the energy is reflected from various formations of the subsurface. The same vessel or another vessel tows one or more streamers. A streamer includes one or more seismic sensors (receivers) that are configured to record the seismic wave reflected by the various formations in the subsurface. The recorded waves are then used to generate the profile of the subsurface.

For marine applications, seismic sources are essentially impulsive (e.g., compressed air is suddenly allowed to expand under water). One of the most used sources is air guns. The air guns produce a high amount of acoustic energy over a short time. Such a source is towed by a vessel either at the water surface or at a certain depth. The acoustic waves from the air guns propagate in all directions. A typical frequency range of the acoustic waves emitted by the impulsive sources is between 6 and 300 Hz. However, the seismic waves generated by two air guns cannot be distinguished (during processing) because they have the same signature. This characteristic of the impulsive sources reduces their effectiveness, as discussed next.

FIG. 1 shows a system 10 in which a source array 20 is towed under water with plural streamers 30 (four in this case). The figure illustrates a cross-sectional view of this system, i.e., a plane perpendicular to the streamers. Seismic waves 22*a-d* emitted by the source array 20 are reflected from an interface 40 in the subsurface, and the reflected waves are recorded by receivers of the streamers 30. A distance "a" between two successive reflections is called a bin size. Because this bin size is measured along a cross-line, "a" represents the cross-line bin size. The cross-line is defined as a line substantially perpendicular to the streamers, different from an axis Z that is also perpendicular on the streamers, but describes the depth of the streamers under water. An inline is a line that extends substantially along the streamers and is perpendicular on the cross-line. For example, the Cartesian system shown in FIG. 1 has the X axis parallel to the inline, the Y axis parallel to the cross-line, and the Z axis describes the depth of the streamers.

With this arrangement, the cross-line bin size is half the cross-line distance 42 between two consecutive streamers. It is noted that the streamers are typically placed 100 m from each other and, thus, a typical cross-line bin size is 50 m. The inline bin size may be much smaller, as it depends mainly on the separation between the receivers in the streamer itself, which may be around 12 to 15 m. With a cross-line bin size on the order of 50 m, aliasing effects may be produced, especially for the highest frequencies, because the maximum bin size is inversely proportional to the frequency. In other words, the illumination of the subsurface on the cross-line is poor. Thus, it is desired to decrease the cross-line bin size during a seismic survey.

A common technique for reducing the cross-line bin size is the use of multiple source arrays that employ a flip-flop acquisition scheme. In this mode, the vessel tows two sources 20 and 20' as shown in FIG. 2. Two sources are shown for simplicity, but more than two sources may be used to increase the coverage. This system 50 is configured to shoot the sources in a flip-flop manner, i.e., shot first one source 20 while the second source 20' is inactive and then, after a period time for listening and recording, the second source 20' is shot while the first source 20 is inactive. The listening period extends for a predetermined time so that the reflections corresponding to the emitted waves from the first source 20 are recorded and the seismic waves generated by the first source 20 die down). Another period of listening and recording follows for the second source. Then, the process is repeated and this flip-flop process constitutes a firing sequence. This scheme doubles the coverage lines of the subsurface as new reflections points are introduced by the second source 20', thus reducing the cross-line bin size to a distance "b", which is smaller than "a".

However, the flip-flop sequence has the following limitation: because there is a time delay (in the order of seconds) between firing the first source and the second source, there are gaps in the data recorded by the streamers. To illustrate these gaps, FIG. 3 shows a top view the two sources 20 and 20' and the streamers 30. Line 40 illustrates the subsurface portion that reflects the seismic waves generated by source 20 to streamer 30*a*, and line 42 illustrates the subsurface portion that reflects the seismic waves generated by the source 20' to the same streamer 30*a*. It is noted that the dash portions of each line 40 and 42 correspond to waiting times, i.e., no recordings, and the solid portions of these lines correspond to recording times.

In other words, when source 20 is active and source 20' is inactive, portion 40*a* of line 40 is actively sampled with acoustic waves and those waves are recorded, while portion 42*a* of line 42 is not sampled by source 20'. As the number of sources is increased, for example, up to four, the waiting times need to be increased. This results in the increase of portion 42*a* (i.e., gap in the recordings). When this portion reaches around 150 m, which is the case for four sources, the gaps in the recorded data are considered unacceptable. Thus, simply increasing the number of sources, although may reduce the cross-line bin size, is not feasible.

Instead of increasing the number of sources for achieving a smaller cross-line bin size, it is possible to increase the number of streamers or to reduce the cross-line distance between the streamers. However, these solutions are not favored by the industry as (1) the price of a streamer and the price for towing the streamer is much higher than towing a source, (2) the drag created by increasing the number of streamers dramatically increases, and (3) a coverage area by each pass of the vessel during the survey is reduced.

Thus, there is a need in the industry to provide a solution that decreases the cross-line bin size, reduces the cost of the survey and also improves the quality of the final image.

SUMMARY

According to one exemplary embodiment, there is a method for actuating at least first and second marine acoustic sources in a firing sequence, the firing sequence including at least a first actuation of the first source followed by a first actuation of the second source followed by a second actuation of the first source and a second actuation of the second source. The method includes towing the first source at a depth in water substantially equal to a depth of the second source; establishing a series of reference time instants; actuating the first source with a variable first time delay relative to the series of reference time instants; and actuating the second source with a variable second time delay relative to the series of reference time instants such that time intervals between consecutive activations of the first and second sources are also variable. The series of reference time instants is calculated based on an assumption that no other source except the first source is present and thus there is no need for a waiting time necessitated by the actuation of the other source before firing again the first source, and a time interval between any two consecutive reference time instants is fixed to a predetermined value, and the first and second sources have a substantially same inline position.

According to another exemplary embodiment, there is a method for processing seismic data indicative of formations of subsurface, the seismic data being generated by actuating first and second marine acoustic sources in a firing sequence, the firing sequence including at least a first actuation of the first source followed by a first actuation of the second source followed by a second actuation of the first source and a second actuation of the second source. The method includes a step of recording with receivers seismic waves reflected from the subsurface, wherein the reflected seismic waves originate from the first and second sources being towed and activated at substantially a same depth under water; a step of determining in a processor, based on (i) a series of reference time instants, (ii) a variable first time delay relative to the series of reference time instants at which the first source is activated, and (iii) a variable second time delay relative to the series of reference time instants at which the second source is activated, two data sets corresponding to the first and second sources; and a step of determining an image of the subsurface based on the two data sets. Time intervals between consecutive activations of the first and second sources are variable and the series of reference time instants is calculated based on an assumption that no other source except the first source is present and thus there is no need for a waiting time necessitated by the actuation of the other source before firing again the first source, and time intervals between any two consecutive reference time instants are fixed to a predetermined value. The first and second sources have a substantially same inline position.

According to still another exemplary embodiment, there is a computing device configured to actuate first and second marine acoustic sources in a firing sequence, the firing sequence including at least a first actuation of the first source followed by a first actuation of the second source followed by a second actuation of the first source and a second actuation of the second source. The computing device includes an interface configured to receive information that the first source is towed at a depth in water substantially equal to a depth of the second source; and a processor connected to the interface. The processor is configured to establish a series of reference time instants, actuate the first source with a variable first time delay relative to the series of reference time instants, and actuate the second source with a variable second time delay relative to the series of reference time instants such that time intervals between consecutive activations of the first and second sources are also variable. The series of reference time instants is calculated based on an assumption that no other source except the first source is present and thus there is no need for a waiting time necessitated by the actuation of the other source before firing again the first source, and time intervals between any two consecutive reference time instants are fixed to a predetermined value, and the first and second sources have a substantially same inline position.

According to yet another exemplary embodiment, there is a computer readable medium including computer executable instructions, wherein the instructions, when executed by a processor, implement one of the above noted methods.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a system that includes a vessel towing at least two air gun array sources. However, the embodiments to be discussed next are not limited to one vessel or two sources or air gun array sources, but may be applied to another number of sources and/or another type of sources, i.e., water gun.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, at least two marine impulsive sources are towed by a vessel and at least two sources are activated in a firing sequence that involves a substantial overlap between the firing of the first source and the firing of the second source. To be able to separate the signals from the two or more sources, the sources are fired in a delayed manner as described later. With this arrangement, two or more sources that are laterally offset from each other may be fired with almost no waiting time, thus improving coverage of the subsurface and also reducing a cost of the survey as fewer streamers may be needed. For a better understanding of these aspects, the next exemplary embodiments present simplified systems that achieve these results. These simplified systems should not be construed to limit the applicability of the novel aspects.

Figure 4:
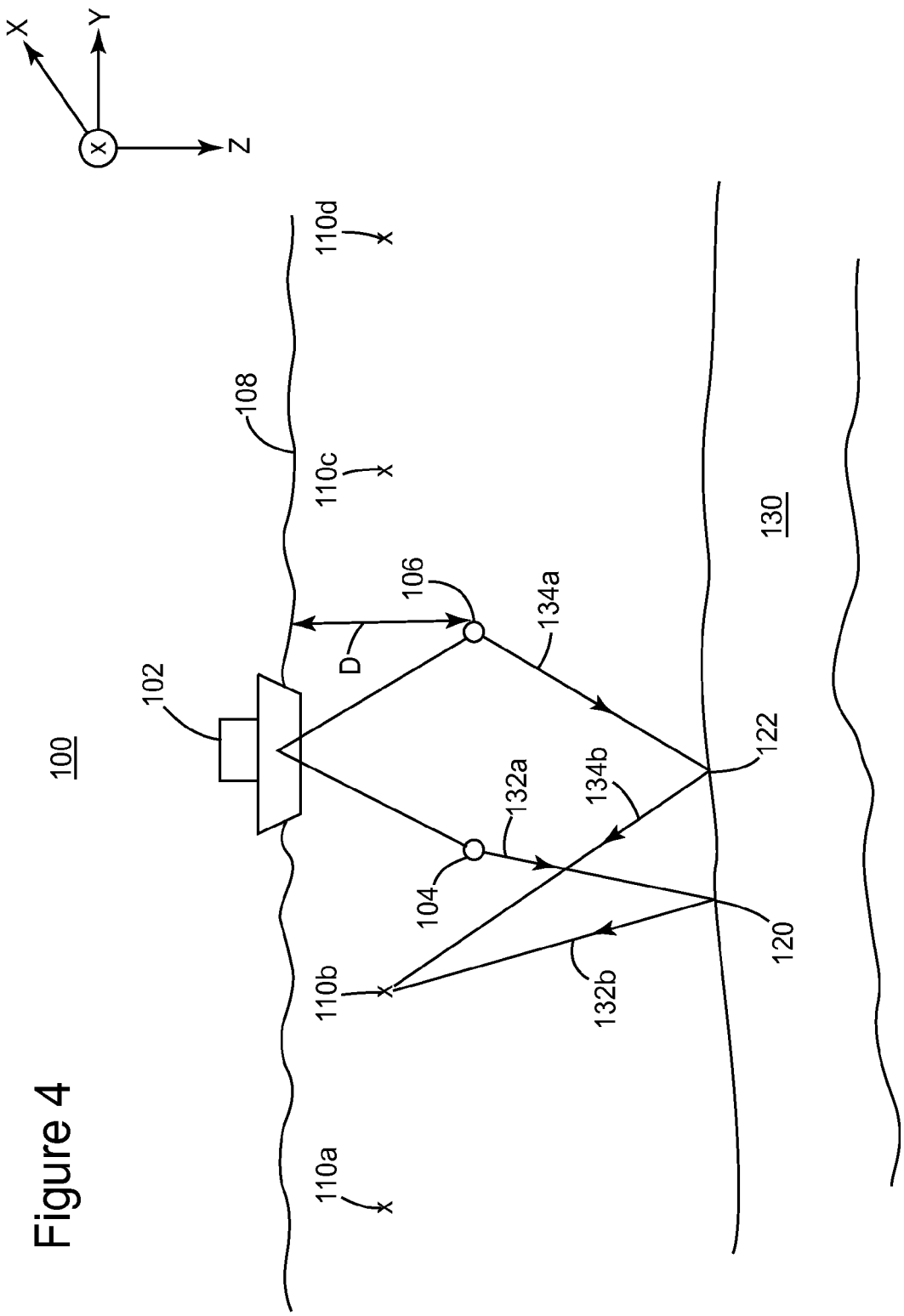
FIG. 4 is a schematic diagram of an arrangement in which two sources are fired almost simultaneously according to an exemplary embodiment.

According to an exemplary embodiment illustrated in FIG. 4, a system 100 includes a vessel 102 that tows two or more marine seismic sources (sources) 104 and 106. For simplicity, only two sources are show in the figure. However, as discussed later, the system may be more efficient when four or six or eight sources are used. Each source may be an array of air guns that are simultaneously or sequentially fired, or a single air gun. The two sources 104 and 106 are towed at substantially the same depth D relative to the water surface 108. By the term "substantially," it is understood that various mechanisms are employed to maintain the sources at the same depth, but due to waves, ocean currents, winds, etc., the depths of the sources may vary from each other in acceptable ranges as known by those skilled in the art. A source array may include plural floats from which individual sources are suspended. The individual sources connected to a float may be distributed along a horizontal line, a curved line, a slanted line, a parameterized line, etc.

The vessel 102 is considered to advance along an inline direction X (entering into page) while the sources 104 and 106 are spread along a cross-line direction Y. This embodiment shows only two sources for simplicity. However, in one application it is envisioned to use at least four sources. A cross-line distance between the sources 104 and 106 along the direction Y may be around 50 m. However, it is possible that the cross-line distance may be in the range of 100 m to 10 m. An inline distance between the sources may be substantially zero. Streamers 110a-d are also shown in the figure. For simplicity, only four streamers are shown. However, more or fewer streamers may be used, depending on the total number of sources and other factors. The streamers may be the traditional horizontal streamers or they might use birds to achieve a desired shape, e.g., curved line, parameterized line, etc. as described in U.S. patent application Ser. No. 13/272,428, filed on Oct. 13, 2011 and assigned to the same assignee as the present application.

Figure 5:
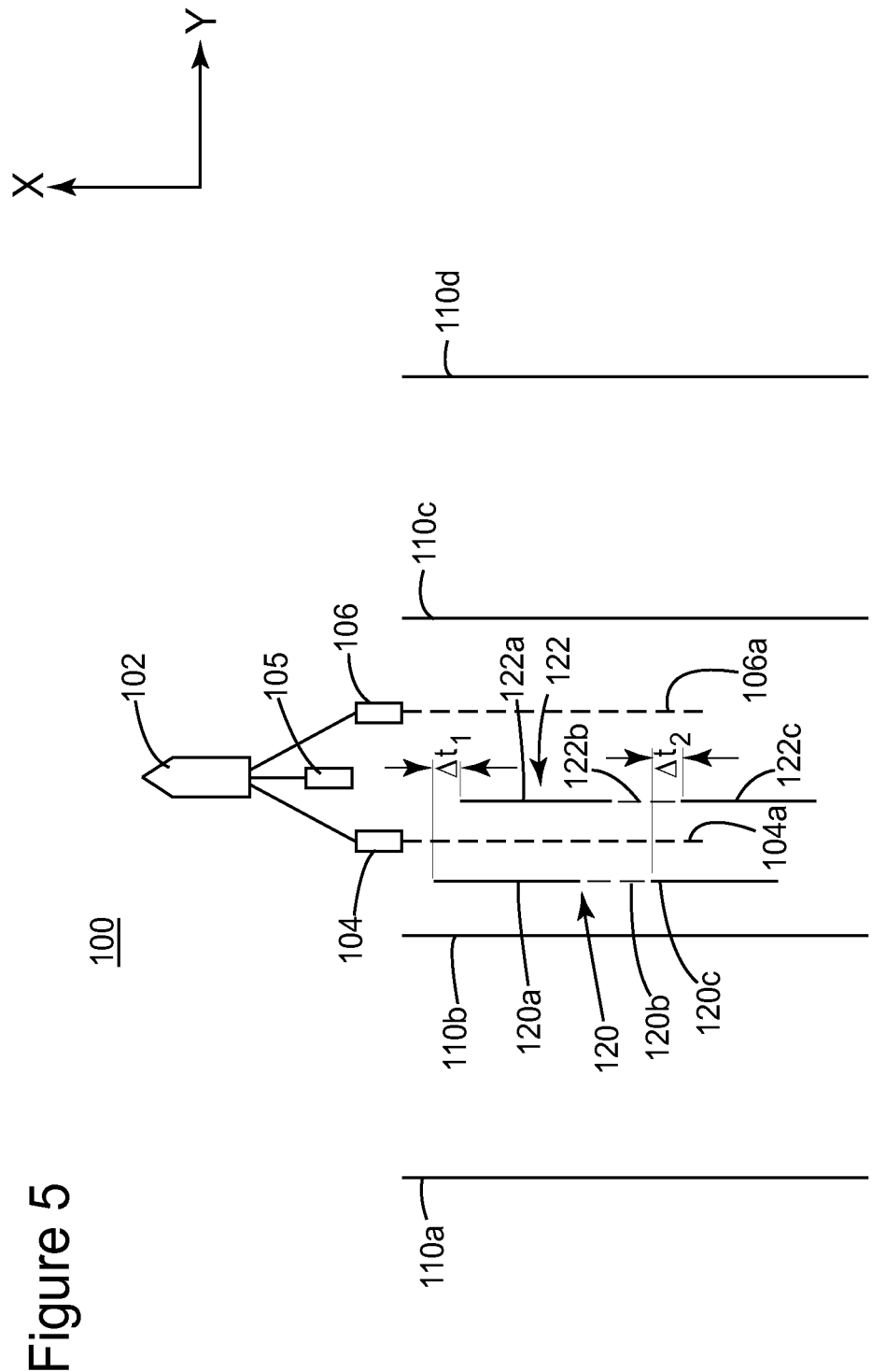
FIG. 5 is a schematic diagram showing an improved coverage for a setup in which two sources are fired almost simultaneously according to an exemplary embodiment.

A top view of the system 100 is shown in FIG. 5. This figure also shows lines 104a and 106a that correspond to towing trajectories of the sources 104 and 106. Lines 120 and 122 are parallel to the streamers and correspond to points on formations (reflectors) in the subsurface 130 that are actively investigated during the seismic survey. In other words, seismic waves 132a and 134a (see FIG. 4) generated by the seismic sources 104 and 106 propagate to the subsurface 130 where they are reflected by portions of various formations (in this case lines 120 and 122). The reflected seismic waves 132b and 134b are recorded by the streamers 110. FIG. 4 shows, for simplicity, the path of the seismic waves only for streamer 110b and only for a single reflector.

With regard to FIG. 5, line 120 has portions 120a and 120c corresponding to points in the subsurface that are sampled and their reflections are recorded, while portions 120b correspond to points in the subsurface that are not sampled and recorded. Line 122 has similar portions to line 120. It is observed that portions 120a and 122a of the recording lines are recorded at almost the same time, i.e., there is a small time delay $\Delta t1$ between the two portions. The time delay corresponds to the time delay with which the first and second sources are activated, as will be discussed later. Further, it is noted that this time delay is on the order of milliseconds, up to one to two seconds, while the waiting time in the setup discussed in FIGS. 2 and 3 was longer than 8 s. A second time delay $\Delta t2$ between portions 120c and 122c, different from the first time delay $\Delta t1$, is also indicated in FIG. 5 and is substantially in the same range as the first time delay.

Figure 2:
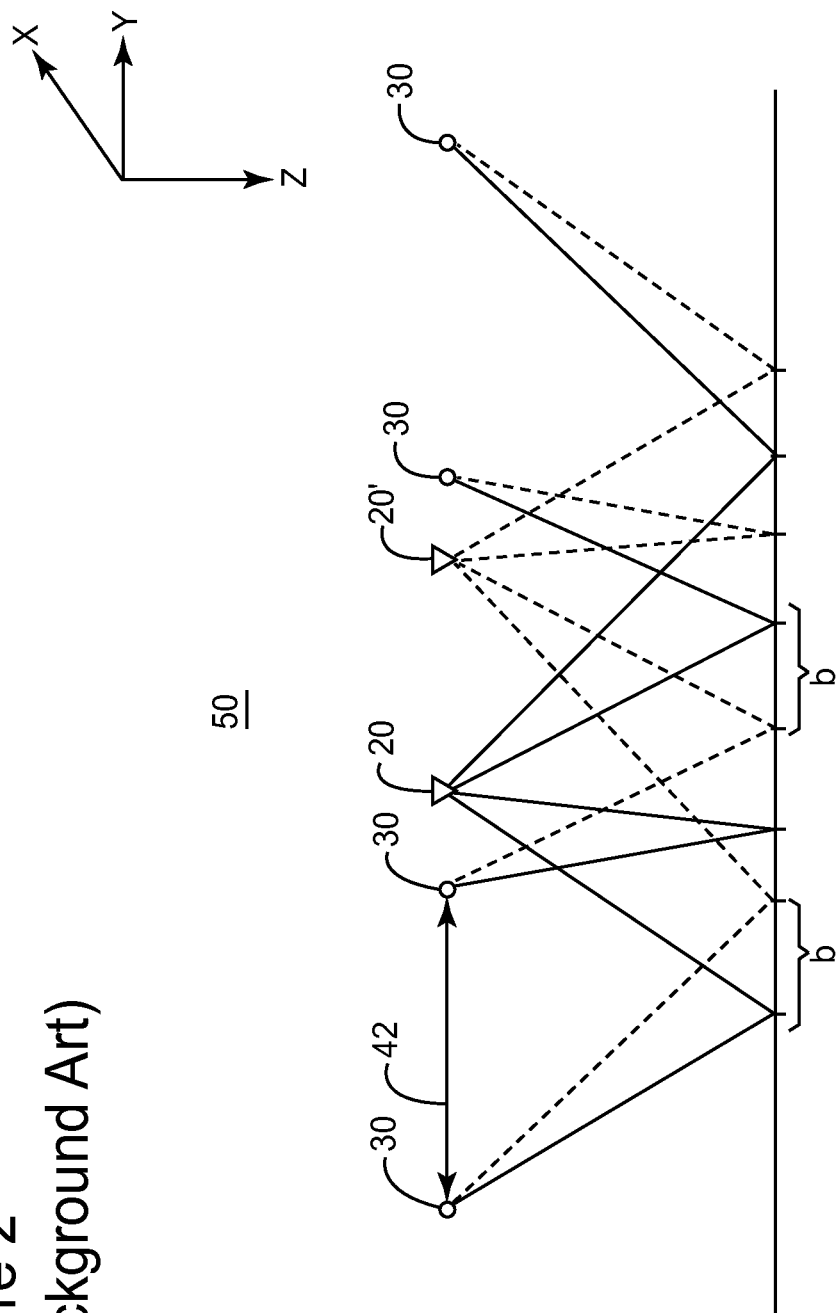
FIG. 2 is a schematic diagram of a cross-line size bin for two sources and multiple streamers.
Figure 3:
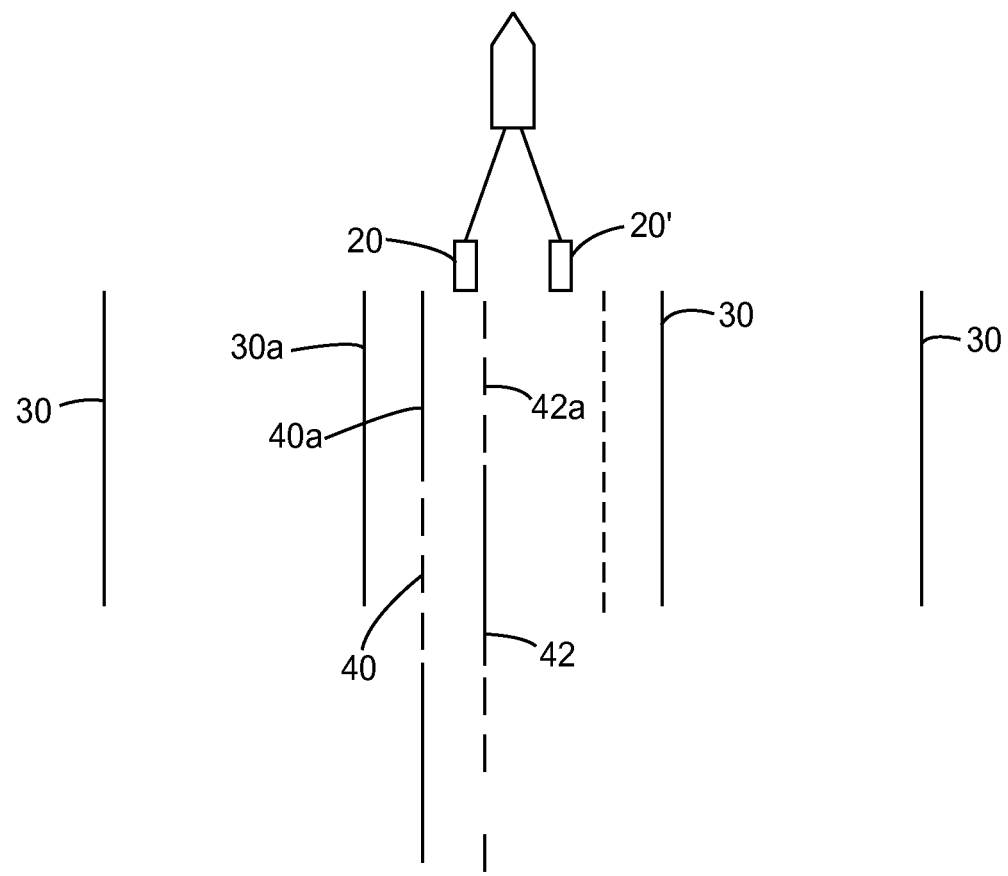
FIG. 3 is a schematic diagram showing recording gaps when using two sources fired simultaneously.

When comparing the novel firing sequence illustrated in FIGS. 4 and 5 to a traditional flip-flop firing sequence for two sources (e.g., as illustrated in FIGS. 2 and 3), an advantage of the novel firing sequence (with two sources) is the fact that the inactive portions 120b and 122b are substantially reduced relative to the inactive portions 42a in the traditional scheme. Thus, according to this exemplary embodiment, not only the cross-line bin size is reduced, but coverage of the subsurface is improved, which results in a better final image of the subsurface.

Further, another advantage of the exemplary embodiments is the possibility to use more than two sources, for example, four, six or eight sources (other numbers are also possible), without the danger of producing large gaps in the recorded data for each line of survey. In other words, it is possible to use the same number of streamers as in a traditional survey but more than two sources, thus improving a cross-line resolution of the final image. Alternatively, it is possible to reduce the number of streamers (to decrease the cost of the survey) and increase the number of sources (which are cheaper to operate than the streamers) without deteriorating the quality of the final image.

In another application, the sources are configured to emit different frequencies. For example, the two sources 104 and 106 may be high-frequency sources and a low-frequency source 105 is also towed by the vessel 102. In another application, four high-frequency sources and one low-frequency source are used. In this case, the four high-frequency sources are randomly fired as discussed next and the low-frequency source is fired independent of the high-frequency sources because the signals produced by a low-frequency source can be distinguished from the signals produced with a high-frequency source. In another application, the four high-frequency sources and the low-frequency sources may be randomly fired within a predetermined time interval. In one application, the sources are fired randomly but the random pattern is recorded and used later when the recorded seismic data is processed. In one application, the four high-frequency sources are located at a same depth and the low-frequency source is located at a different depth. In still another application, all sources, low- and high-frequency are located at a same depth.

Figure 6:
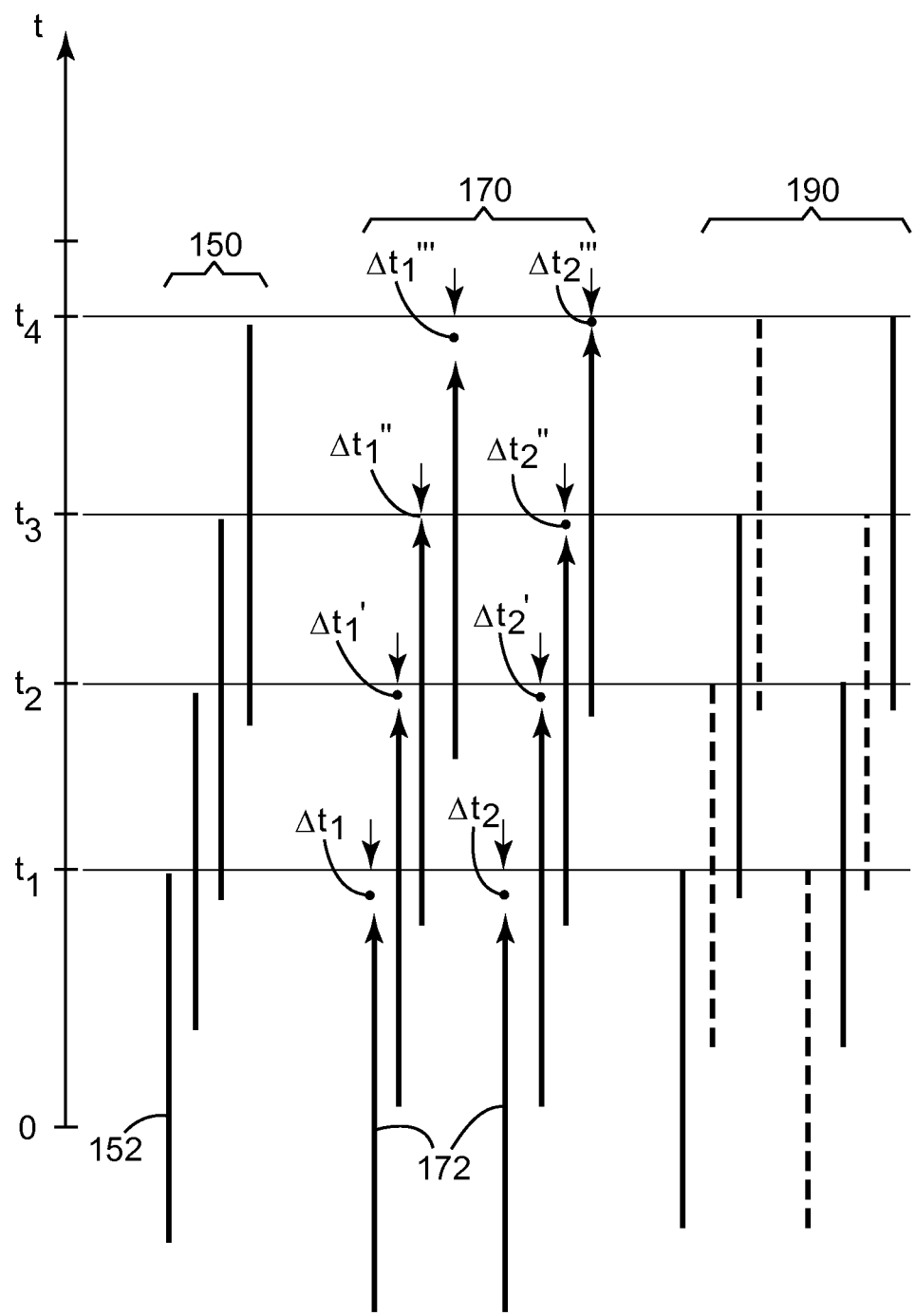
FIG. 6 is a schematic diagram that shows almost simultaneous firing of two sources according to an exemplary embodiment.

Returning to the sources shown in FIGS. 4 and 5, their firing sequence is now discussed with reference to FIG. 6. FIG. 6 shows a series of reference time instants (t1 to t4) that are calculated, for example, based on an assumption that no other source except the first source is present. If this is the case, there is no need for a waiting time necessitated by the actuation of the other source before again firing the first source. Thus, for the case of a single seismic source, the single source is activated at times t1, then at t2, then at t3 and so on. After the first activation at t1, the streamers record the reflected signals for a time period Δt (which may be equal to or less than t2–t1) after which the source is again fired at t2 and the streamers again record the reflected signals. Schematically, this traditional recording by the streamers is shown by reference number 150. When the source is fired at time t1, a coverage line 152 is illuminated by the source and reflections from the coverage line 152 are recorded by a single streamer. Thus, a coverage line 152 is similar to lines 120 and 122 in FIG. 5.

However, the situation described in the exemplary embodiments involves two or more sources that are fired randomly, without implementing the traditional waiting times. Thus, for this novel scenario, the first source is fired with a time delay Δt1 relative to t1, while the second source is fired with a time delay Δt2 relative to t1 as shown in FIG. 6. Then, the first source is fired with a time delay Δt1' and the second source is fired with a time delay Δt2' relative to t2. Next, the first source is fired with a time delay Δt1'' (which happens to be zero) and the second source is fired with a time delay Δt2'' relative to t3. The firing sequence continues with delays Δt1''' and Δt2''' and so on. It is noted that the delay times can be negative or positive.

Thus, the novel firing sequence 170 (illustrated only for two sources) which is also represented in FIG. 6 achieves a better coverage of the subsurface as indicated by the lines 172. It is noted that lines 172 correspond to coverage lines, and these lines do not have dotted portions because there is no need for a waiting time. The novel firing sequence includes at least two sources, towed at substantially the same depth, and fired with a sequence of time delays (Δt1, Δt2), (Δt1', Δt2'), etc. The firing sequence's time delays are random, or pseudo-random or systematically varying (e.g., a time difference between consecutive delays linearly increases or decreases, or polynomially increases or decreases, or exponentially increases or decreases, etc.). One or more of the time delays may be zero. In one application, the time delays are less than one second and, preferably, in the range of 50 to 500 ms. In one application the first and second sources are identical.

FIG. 6 also shows corresponding coverage lines for an arrangement 190 in which two sources are fired using a traditional flip-flop scheme. FIG. 6 shows that except for small time intervals (i.e., Δt1-Δt2), the coverage lines have no data gaps in the arrangement 170 (i.e., the waves of the two sources are substantially overlapped) while the coverage lines in the arrangement 190 are not, resulting in poor coverage for this last arrangement.

Figure 7:
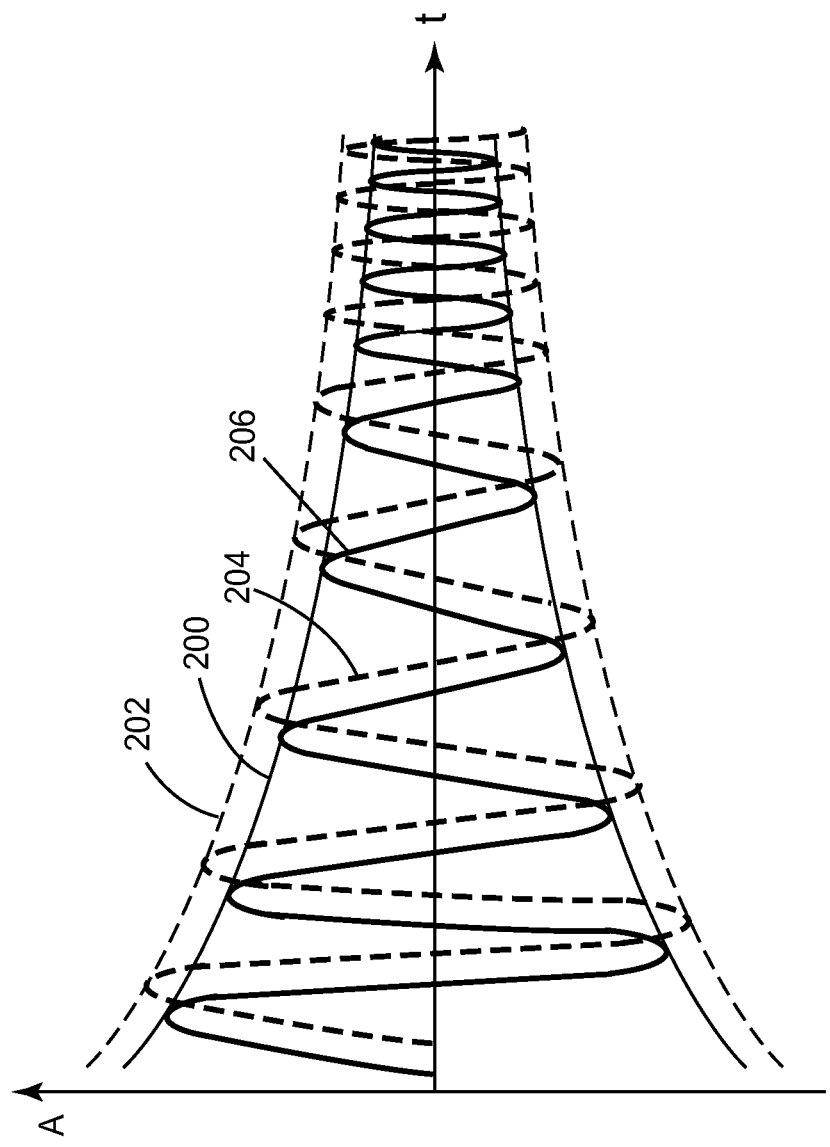
FIG. 7 is a schematic diagram illustrating far field signatures of sources provided close to each other according to an exemplary embodiment.

In addition, according to the arrangement 170, the frequency spectra of the two sources are superimposed in a constructive way as indicated in FIG. 7. FIG. 7 shows envelopes 200 and 202 of the far-field signatures (i.e., amplitude of water pressure generated by the source and measured far away from the source) of the two sources 104 and 106, measured at the same time and at the same point. FIG. 7 illustrates amplitude versus time of the far-field signatures. Although the amplitudes 204 and 206 of the two sources may not be in phase, the two envelopes substantially overlap because of the small time delay Δt1-Δt2 between the firing of the two sources. In one application, the time interval between the two delays Δt1 and Δt2 although small (e.g., less than one second) is varying in time.

Figure 1:
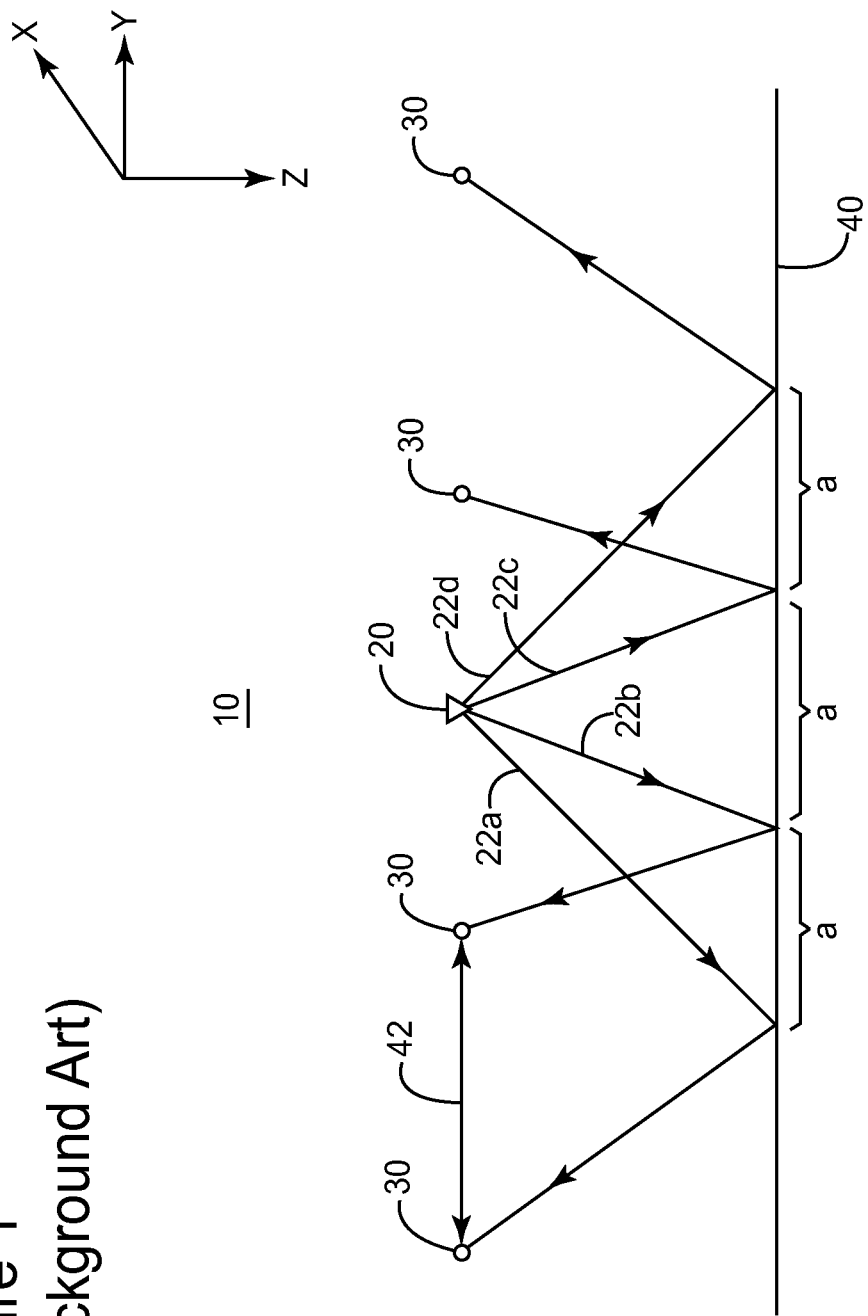
FIG. 1 is a schematic diagram of a cross-line size bin for a source and multiple streamers.

To the contrary, a traditional seismic survey presented in U.S. Pat. No. 6,882,938 (herein '938", the entire content of which is incorporated herein by reference) fires two sources with some time delays to each other, but the two sources are placed at large inline distances relative to each other, e.g., thousands of meters. In this respect, FIGS. 2 and 3 of '938 show that a distance between the first source (SA1 and SA2 in FIG. 1) and the second source (SB1 and SB2 in FIG. 1) is on the order of 1000 m. However, an inline distance between sources 104 and 106 in the exemplary embodiments is substantially zero.

The inline distance between the sources in '938 makes these sources less effective than the system proposed in this patent application because the seismic energies propagated to a subsurface point from sources located at large inline distances (e.g., 1000 m) do not enhance each other. In other words, sources separated by, for example, 2 km, and fired as illustrated in FIG. 6, would determine a cross-talk in the recorded signals, which would be the equivalent of an echo at a bad location. On the contrary, in the exemplary embodiments, the seismic energies propagated to the subsurface enhance each other due to the relative close locations of the sources (e.g., on the order of hundreds of meters). For this situation, the cross-talk of the sources results in a kind of smearing function that is applied to the final image of the subsurface.

Figure 8:
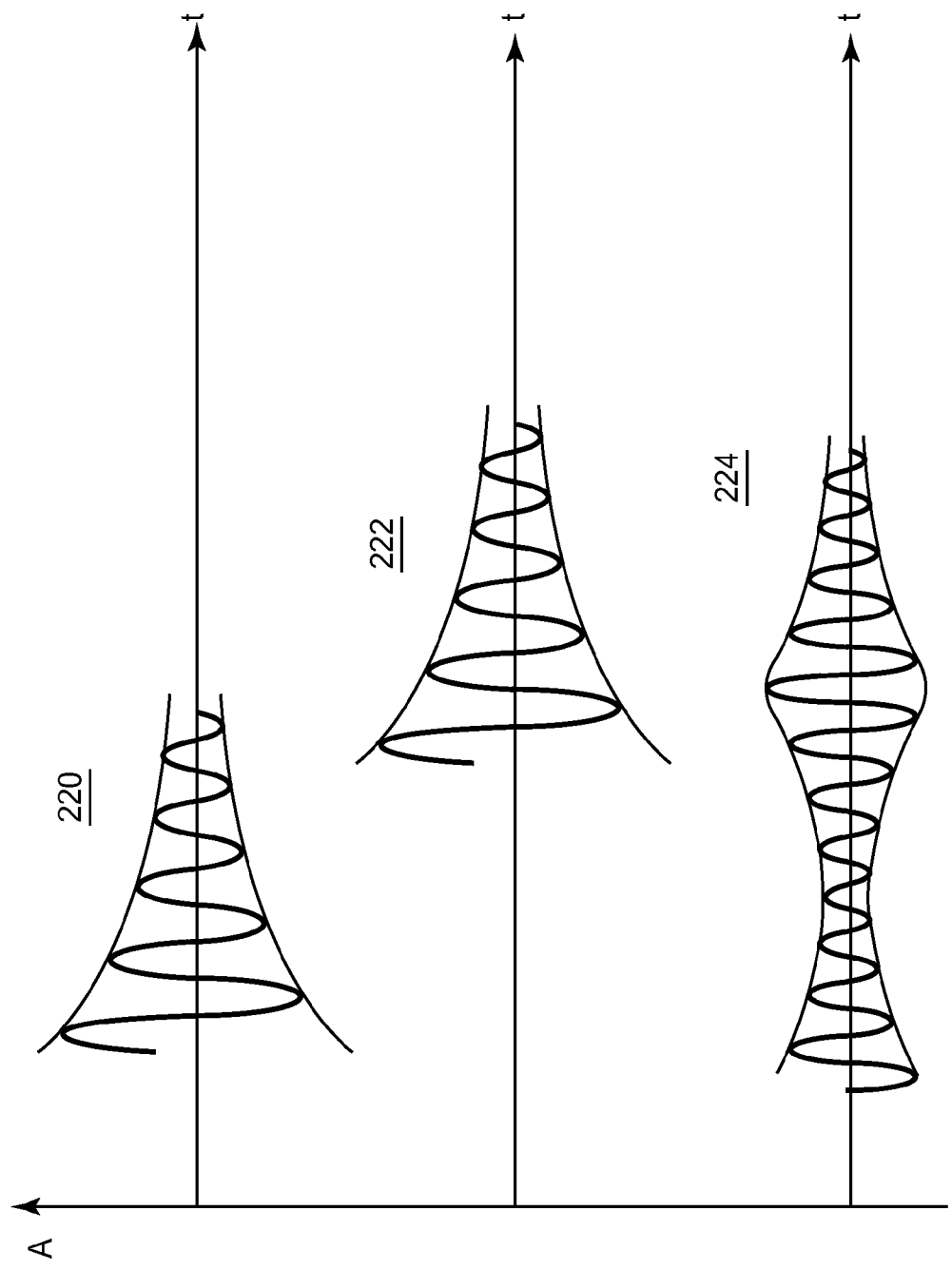
FIG. 8 is a schematic diagram illustrating far field signatures of sources provided far away from each other.

The scenario discussed in '938, i.e., firing two sources provided at thousands of meters apart, would produce, at a certain location in the subsurface, a far-field signature as illustrated in the bottom graph of FIG. 8. When monitoring an amplitude of the seismic pressure at a certain point in the subsurface, an amplitude of the seismic energy of the first source received at this point is described by 220, an amplitude of the seismic energy of the second source received at the same point is described by 222, and a combined energy of the first and second sources received at the given point is described by 224. Thus, it is noted that peaks of the energies 220 and 222 are not coincident as these energies need to travel different distances from the corresponding sources to the given point. This lack of coincidence translates into an energy which is not enhanced comparative to the independent sources.

On the contrary, when firing two sources located close to each other on cross-line (e.g., 50 m) and at the same location inline and almost simultaneously as discussed with regard to FIG. 7, a 3 dB increase in the energy level is observed. Also, it is noted that the two or more sources of the exemplary embodiments do not have to be coherent, as apparently required in '938. With regard to FIG. 7, it is noted that a time difference between two consecutive time instants is fixed to a predetermined value. For example, this predetermined value may be in the range of 8 to 12 s. However, the exact value may depend on the depth of the ocean, the length of the streamers, and other factors.

Having discussed the method for firing the sources, it is now discussed how to process the recorded data in order to determine the image of the subsurface. Many techniques are available in the art for processing recorded seismic data for determining the final image of the subsurface. Thus, the details of these techniques are omitted herein. However, one such technique is discussed in U.S. Patent Application Publication No. 2010/0008184 (herein "'184"), the entire content of which is incorporated herein by reference.

Two sources in '184 are provided at different depths and are fired at selected times after delay times relative to a start of the seismic recording of the acquisition system. After measuring the seismic signals, the recorded signals are sorted, e.g., into a common receiver position domain. The signals are then time aligned with respect to an actuation of a first source at a first depth, and coherent energy related to the first source is extracted. The same process is performed for the second source at the second depth. Then, '184 separates up- and down-going wave fields from each source, propagates them to a common reference point, applies a phase shift, sums the so modified up- and down-going wave fields, and generates a final image of the subsurface.

However, this approach of '184 has at least the following limitation: because the first source has a depth different from the second source, the total source energy which is imparted to the water by the two sources and arrives at a given point in the subsurface does not increase comparative to the traditional case in which the second source is fired after a long enough time after the first source so that there is no overlap of the signals of the two sources. In other words, the solution proposed by Hegna et al. does not improve a signal-to-noise ratio for most frequencies of the frequency spectrum. In fact, it is believed that the '184 solution results in a loss of energy by placing the sources at different depths.

Figure 9:
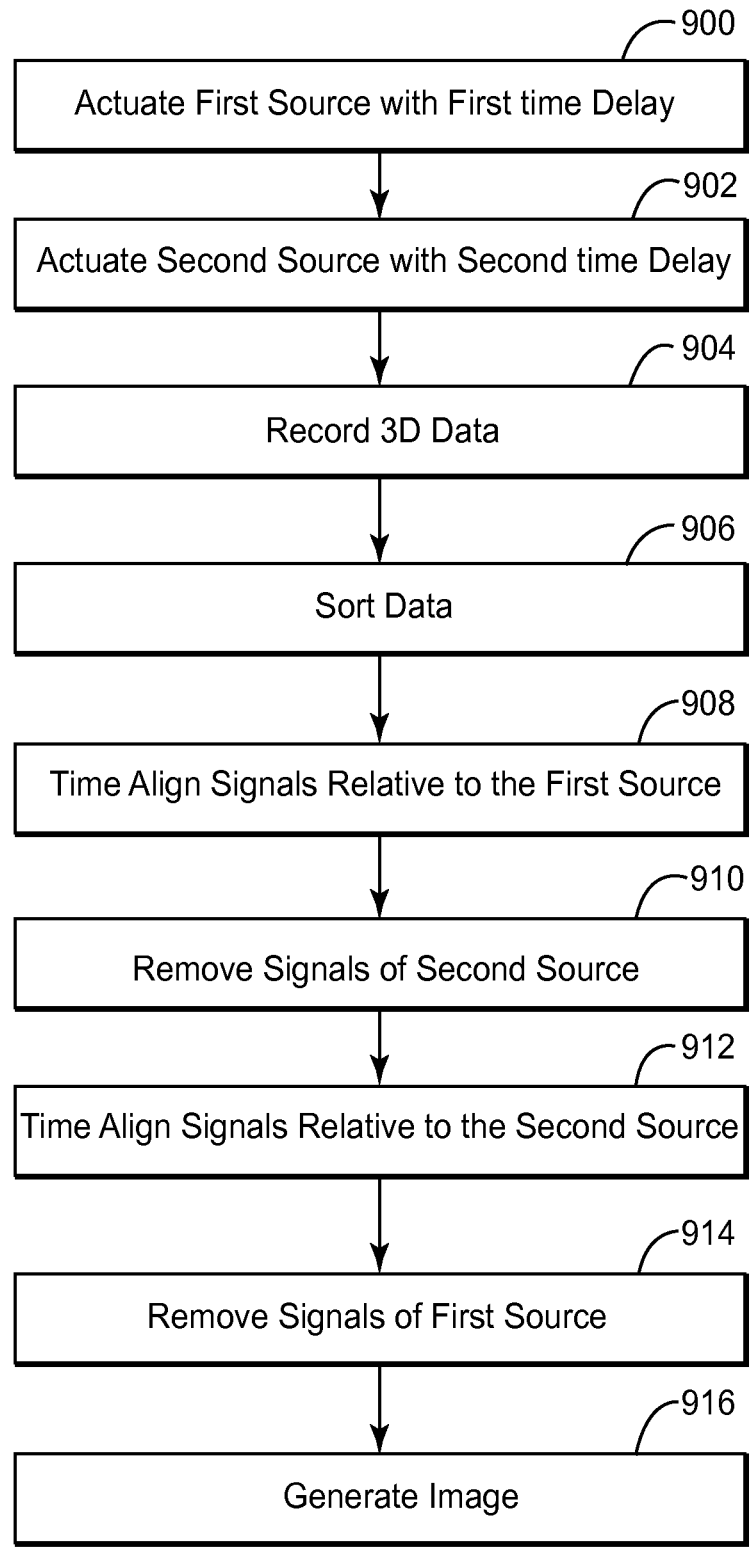
FIG. 9 is a flow chart of a method for processing data according to an exemplary embodiment.

Thus, according to an exemplary embodiment, a novel method for processing the seismic data collected during a seismic survey performed with at least two seismic sources provided at substantially the same depth is discussed now. As illustrated in FIG. 9, in step 900, a first source is activated with a first time delay as described in FIG. 6. In step 902, a second source is activated with a second time delay as also described in FIG. 6. More than two sources may be actuated with corresponding time delays and, in fact, the invention becomes more efficient as the number of sources increases over two. However, for exemplifying the method, only two sources are considered in this exemplary embodiment. Further, the sources are provided at substantially the same depth.

In step 904, recorders on streamers (e.g., a three-dimensional streamer set) record data reflected from the reflectors of the subsurface. Techniques for recording seismic data are known, as well as the type of recorders. Any type of recorder may be used for this method. In step 906, the recorded data may be sorted into gathers. A gather is a collection of seismic traces made according to some trace header parameter. It is defined as a side-by-side display of seismic traces which have some acquisition parameter in common. The acquisition parameter may be a common-shot point (this is the collection of all the data from one shot), or a common-receiver gather (this is the complete set of data that was received at receiver), or a common-offset or common-range gather (this displays the succession of data traces which have the same offset distance between the shot point and receiver), or a common-midpoint CMP or common-depth point CDP gather (this displays all the data for the same reflection midpoint), etc.

In step 908, the recorded signals (raw data) are time aligned with respect to the first source. The time alignment may be implemented by time shifting the traces in each gather by the time delays of the first source in each firing sequence, i.e., $\Delta t1$, $\Delta t1'$, $\Delta t1''$, $\Delta t1'''$ and so on. Following the alignment of the traces with respect to the first source, the traces corresponding to the second source may be removed in step 910 by using, for example, a filter. The remaining traces form a first set of data that is associated with the first source.

Thus, the first set of data may be determined, based on (i) a series of reference time instants at which to actuate the first source, and (ii) a variable first time delay relative to the series of reference time instants at which the first source is actually activated.

The steps 908 and 910 may be repeated as steps 912 and 914 for the second source so that a second set of data for the second source is obtained. It is noted that step 912 acts on the raw recorded data to align the signals and not on data output by step 910.

In step 916, the final image of the subsurface is determined based on one or both sets of data corresponding to the first and second sources. Traditional algorithms may be used during this step as, for example, migration, mirror migration, staking, etc., for processing the data. It is noted that the method may be extended to plural sources, which results in corresponding plural data sets. All these data sets may be used to generate the final image that has a better cross-line resolution than the existing methods.

Figure 10:
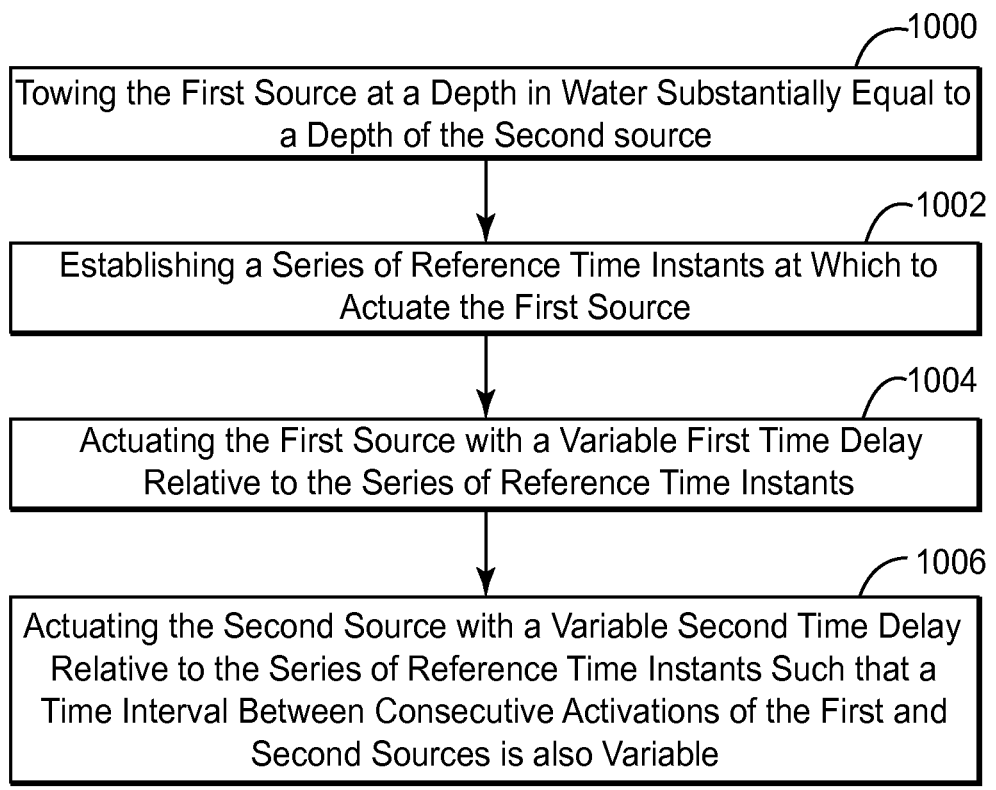
FIG. 10 is a flow chart of a method for firing sources according to an exemplary embodiment.

According to an exemplary embodiment, illustrated in FIG. 10, there is a method for processing seismic data indicative of formations of a subsurface. The data is generated by actuating first and second marine acoustic sources in a firing sequence, the firing sequence including at least a first actuation of the first source followed by a first actuation of the second source followed by a second actuation of the first source and a second actuation of the second source. The method includes a step 1000 towing the first source at a depth in water substantially equal to a depth of the second source; a step 1002 of establishing a series of reference time instants at which to actuate the first source; a step 1004 of actuating the first source with a variable first time delay relative to the series of reference time instants; and a step 1006 of actuating the second source with a variable second time delay relative to the series of reference time instants such that a time interval between consecutive activations of the first and second sources is also variable. The series of reference time instants is calculated based on an assumption that no other source except the first source is present and thus there is no need for a waiting time necessitated by the actuation of the other source before firing again the first source, and a distance between any two consecutive reference time instants is fixed to a predetermined value.

Figure 11:
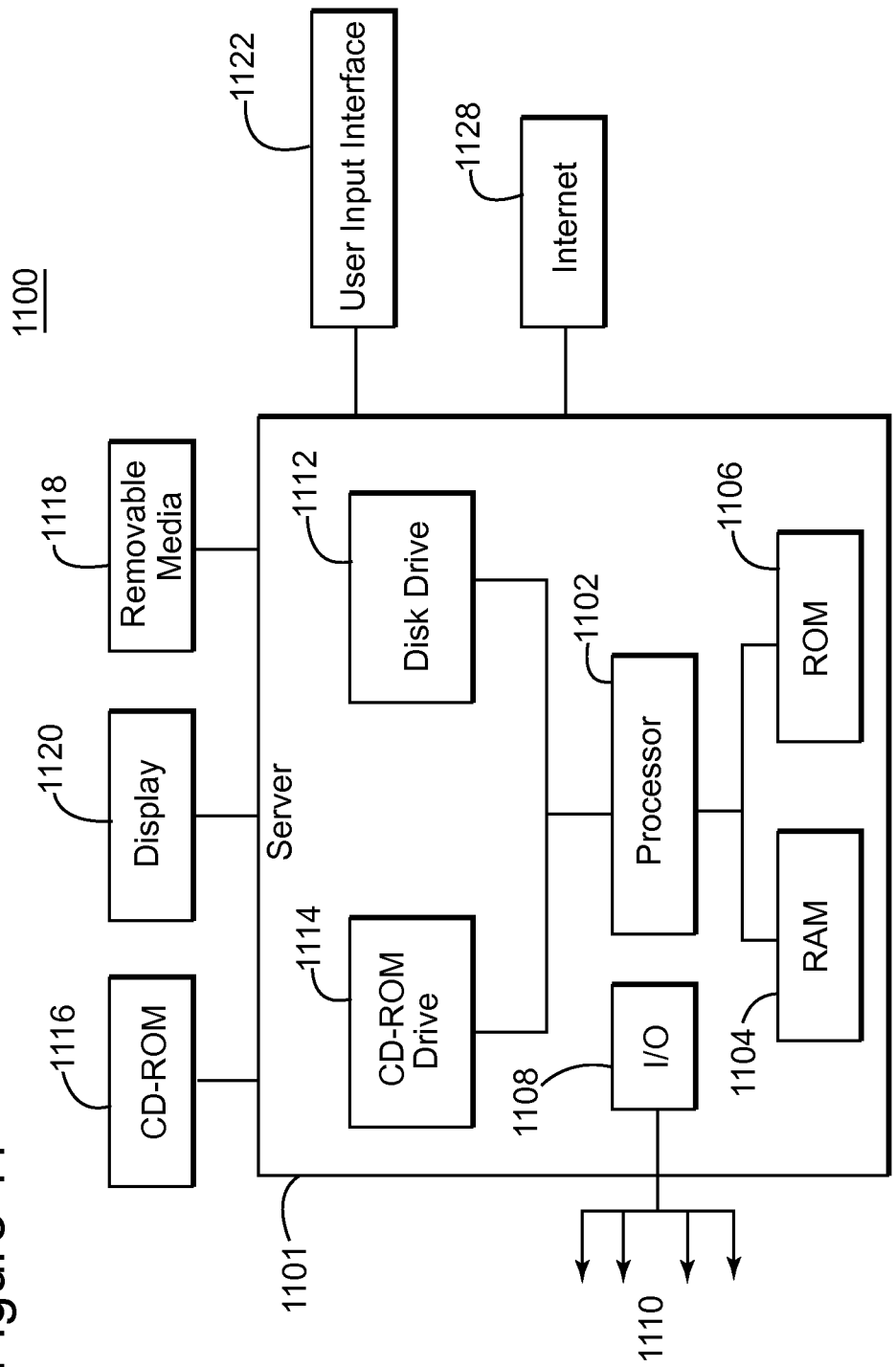
FIG. 11 is a schematic diagram of a computing device for implementing the method of FIG. 10 according to an exemplary embodiment.

One or more of the methods discussed above may be implemented in a computing system specifically configured to calculate gathers, sort data, time align signals, etc. An example of a representative computing system capable of carrying out operations in accordance with the exemplary embodiments is illustrated in FIG. 11. Hardware, firmware, software or a combination thereof may be used to perform the various steps and operations described herein.

The exemplary computing system 1100 suitable for performing the activities described in the exemplary embodiments may include server 1101. Such a server 1101 may include a central processor (CPU) 1102 coupled to a random access memory (RAM) 1104 and to a read-only memory (ROM) 1106. The ROM 1106 may also be other types of storage media to store programs, such as programmable ROM (PROM), erasable PROM (EPROM), etc. The processor 1102 may communicate with other internal and external components through input/output (I/O) circuitry 1108 and bussing 1110, to provide control signals and the like. The processor 1102 carries out a variety of functions as is known in the art, as dictated by software and/or firmware instructions.

The server 1101 may also include one or more data storage devices, including hard drives 1112, CD-ROM drives 1114, and other hardware capable of reading and/or storing information such as DVD, etc. In one embodiment, software for carrying out the above discussed steps may be stored and distributed on a CD-ROM 1116, diskette 1118 or other form of media capable of portably storing information. These storage media may be inserted into, and read by, devices such as the CD-ROM drive 1114, the disk drive 1112, etc. The server 1101 may be coupled to a display 1120, which may be any type of known display or presentation screen, such as LED, LCD, plasma display, cathode ray tubes (CRT), etc. A user input interface 1122 is provided, including one or more user interface mechanisms such as a mouse, keyboard, microphone, touch pad, touch screen, voice-recognition system, etc.

The server 1101 may be coupled to other computing devices, such as the landline and/or wireless terminals via a network. The server may be part of a larger network configuration as in a global area network (GAN) such as the Internet 1128, which allows ultimate connection to the various landline and/or mobile client devices. The computing device may be implemented on a vessel that performs a seismic survey. The computing device may be configured to actuate first and second marine acoustic sources in a firing sequence, the firing sequence including at least a first actuation of the first source followed by a first actuation of the second source followed by a second actuation of the first source and a second actuation of the second source.

The disclosed exemplary embodiments provide a system and a method for firing sources provided at a same depth and for processing data recorded as a consequence of the firing for producing a final image of the subsurface. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for actuating at least first and second marine acoustic sources in a firing sequence, the firing sequence including at least a first actuation of the first source followed by a first actuation of the second source followed by a second actuation of the first source and a second actuation of the second source, the method comprising:
   towing the first source at a depth in water substantially equal to a depth of the second source;
   establishing a series of reference time instants;
   actuating the first source with a variable first time delay relative to the series of reference time instants; and
   actuating the second source with a variable second time delay relative to the series of reference time instants such that time intervals between consecutive activations of the first and second sources are also variable,
   wherein the series of reference time instants is calculated based on an assumption that no other source except the first source is present and thus there is no need for a waiting time necessitated by the actuation of the other source before firing again the first source, and a time interval between any two consecutive reference time instants is fixed to a predetermined value, and
   the first and second sources have a substantially same inline position.

2. The method of claim 1, wherein the time intervals between consecutive activations of the first and second sources are random.

3. The method of claim 1, wherein the time intervals between consecutive activations of the first and second sources are semi-random.

4. The method of claim 1, wherein the time intervals between consecutive activations of the first and second sources are systematically varying.

5. The method of claim 1, further comprising:
   towing third and fourth sources at a same depth as the first and second sources and at the same inline position;
   actuating the third source with a variable third time delay relative to the series of reference time instants; and
   actuating the fourth source with a variable fourth time delay relative to the series of reference time instants,
   wherein a cross-line distance between two adjacent sources is 25 m or less.

6. The method of claim 1, further comprising:
   towing a low-frequency source while the first and second sources are high-frequency sources.

7. The method of claim 1, wherein the first and second sources are identical.

8. The method of claim 1, wherein each of the first and second sources includes an array of air guns.

9. The method of claim 1, further comprising:
   towing plural streamers with a same vessel that tows the first and second sources; and
   recording simultaneously reflected seismic waves corresponding to the first and second sources,
   wherein the plural streamers have a depth-varying profile.

10. A method for processing seismic data indicative of formations of subsurface, the seismic data being generated by actuating first and second marine acoustic sources in a firing sequence, the firing sequence including at least a first actuation of the first source followed by a first actuation of the second source followed by a second actuation of the first source and a second actuation of the second source, the method comprising:
   recording with receivers seismic waves reflected from the subsurface, wherein the reflected seismic waves originate from the first and second sources being towed and activated at substantially a same depth under water;
   determining in a processor, based on (i) a series of reference time instants, (ii) a variable first time delay relative to the series of reference time instants at which the first source is activated, and (iii) a variable second time delay relative to the series of reference time instants at which the second source is activated, two data sets corresponding to the first and second sources; and
   determining an image of the subsurface based on the two data sets,
   wherein time intervals between consecutive activations of the first and second sources are variable,
   wherein the series of reference time instants is calculated based on an assumption that no other source except the first source is present and thus there is no need for a waiting time necessitated by the actuation of the other source before firing again the first source, and time intervals between any two consecutive reference time instants are fixed to a predetermined value, and
   the first and second sources have a substantially same inline position.

11. The method of claim 10, wherein the time intervals between consecutive activations of the first and second sources are random.

12. The method of claim 10, wherein the time intervals between consecutive activations of the first and second sources are semi-random.

13. The method of claim 10, wherein the time intervals between consecutive activations of the first and second sources are systematically varying.

14. The method of claim 10, wherein a cross-line distance between the first and second sources is 25 m or less.

15. The method of claim 10, further comprising:
towing a low-frequency source while the first and second sources are high-frequency sources.

16. The method of claim 10, wherein the first and second sources are identical.

17. The method of claim 10, wherein each of the first and second sources includes an array of air guns.

18. The method of claim 10, further comprising:
when comparing at a same instant and at a same location underwater an envelope of a far-field signature of the first source with an envelope of a far-field signature of the second source, the two envelopes substantially overlap.

19. A computing device configured to actuate first and second marine acoustic sources in a firing sequence, the firing sequence including at least a first actuation of the first source followed by a first actuation of the second source followed by a second actuation of the first source and a second actuation of the second source, the computing device comprising:
an interface configured to receive information that the first source is towed at a depth in water substantially equal to a depth of the second source; and
a processor connected to the interface and configured to,
establish a series of reference time instants,
actuate the first source with a variable first time delay relative to the series of reference time instants, and
actuate the second source with a variable second time delay relative to the series of reference time instants such that time intervals between consecutive activations of the first and second sources are also variable,
wherein the series of reference time instants is calculated based on an assumption that no other source except the first source is present and thus there is no need for a waiting time necessitated by the actuation of the other source before firing again the first source, and time intervals between any two consecutive reference time instants are fixed to a predetermined value, and
the first and second sources have a substantially same inline position.

20. A computer readable medium including computer executable instructions, wherein the instructions, when executed by a processor, implement a method for actuating first and second marine acoustic sources in a firing sequence, the firing sequence including at least a first actuation of the first source followed by a first actuation of the second source followed by a second actuation of the first source and a second actuation of the second source, the method comprising:
towing the first source at a depth in water substantially equal to a depth of the second source;
establishing a series of reference time instants;
actuating the first source with a variable first time delay relative to the series of reference time instants; and
actuating the second source with a variable second time delay relative to the series of reference time instants such that time intervals between consecutive activations of the first and second sources are also variable,
wherein the series of reference time instants is calculated based on an assumption that no other source except the first source is present and thus there is no need for a waiting time necessitated by the actuation of the other source before firing again the first source, and a time interval between any two consecutive reference time instants is fixed to a predetermined value, and
the first and second sources have a substantially same inline position.

* * * * *